(12) United States Patent
Hatton

(10) Patent No.: US 7,857,256 B2
(45) Date of Patent: Dec. 28, 2010

(54) THRUST GENERATING APPARATUS

(75) Inventor: Geoffrey Hatton, Peterborough (GB)

(73) Assignee: Aesir Ltd., Cambridgeshire (GB)

( * ) Notice: Subject to any disclaimer, the term of this patent is extended or adjusted under 35 U.S.C. 154(b) by 579 days.

(21) Appl. No.: 11/909,524

(22) PCT Filed: Mar. 23, 2006

(86) PCT No.: PCT/GB2006/050064

§ 371 (c)(1), (2), (4) Date: Sep. 24, 2007

(87) PCT Pub. No.: WO2006/100523

PCT Pub. Date: Sep. 28, 2006

(65) Prior Publication Data

US 2008/0213090 A1 Sep. 4, 2008

(30) Foreign Application Priority Data

Mar. 23, 2005 (GB) ................ 0505956.3

(51) Int. Cl.
*B64C 29/00* (2006.01)
(52) U.S. Cl. .............. 244/23 C; 244/12.2; 244/34 A
(58) Field of Classification Search .............. 244/23 C, 244/12.2, 34 A, 36, 39
See application file for complete search history.

(56) References Cited

U.S. PATENT DOCUMENTS

| 1,104,542 | A | 7/1914 | Porter |
| 2,108,652 | A | 2/1938 | Coanda |
| 2,927,746 | A | 3/1960 | Mellen |
| 2,978,206 | A | 4/1961 | Johnson |
| 2,997,254 | A | 8/1961 | Mulgrave et al. |

(Continued)

FOREIGN PATENT DOCUMENTS

AT 370049 2/1983

(Continued)

OTHER PUBLICATIONS

D. G. Gregory-Smith and C.J. Robinson, The Discharge from a Thin Slot Over a Surface of Convex Curvature, pp. 329-339, 1982, Int. J. Mech. Sci, vol. 24, No. 6, Pergamon Press Ltd.

(Continued)

*Primary Examiner*—Christopher P Ellis
(74) *Attorney, Agent, or Firm*—Martin Fleit; Paul D. Bianco; Fleit Gibbons Gutman Bongini & Bianco PL

(57) ABSTRACT

There have been past proposals for air vehicles employing the Coanda effect. In these proposals, a jet of fluid, usually air, is made to flow radially outwardly over 5 a dome-shaped canopy to create lift. A cross-section through the canopy is curved to follow a segment of a circle or it may have a radius of curvature that increases in the direction of flow. In the invention, the radius (r) of the canopy curve decreases towards the downstream direction (x) in a way that is related to the decrease in the width of 10 the jet as it flows over the surface. This means that the radius of curvature decreases (instead of increasing) towards the downstream direction with the rate of decrease being progressively less rapid towards the downstream direction.

15 Claims, 2 Drawing Sheets

U.S. PATENT DOCUMENTS

| | | | |
|---|---|---|---|
| 3,224,711 A * | 12/1965 | Warren et al. | 244/23 C |
| 3,276,723 A | 10/1966 | Miller et al. | |
| 3,405,889 A | 10/1968 | Wagle | |
| 3,697,020 A | 10/1972 | Thompson | |
| 3,747,726 A * | 7/1973 | Walter | 180/129 |
| 4,516,747 A | 5/1985 | Lurz | |
| 4,674,708 A | 6/1987 | Del Castillo | |
| 5,031,859 A | 7/1991 | Cunningham | |
| 5,054,713 A * | 10/1991 | Langley et al. | 244/12.2 |
| 5,170,963 A | 12/1992 | Beck | |
| 5,203,521 A | 4/1993 | Day | |
| 5,503,351 A | 4/1996 | Vass | |
| 5,803,199 A * | 9/1998 | Walter | 180/120 |
| 6,082,478 A * | 7/2000 | Walter et al. | 180/120 |
| 6,234,751 B1 | 5/2001 | Hassan et al. | |
| 6,270,036 B1 * | 8/2001 | Lowe, Jr. | 244/12.2 |
| 6,412,732 B1 | 7/2002 | Amitay et al. | |
| 6,450,446 B1 | 9/2002 | Holben | |
| 6,457,654 B1 | 10/2002 | Glezer | |
| 2004/0129831 A1 | 7/2004 | Dunagin, Jr. | |
| 2004/0164203 A1 * | 8/2004 | Billiu | 244/35 R |
| 2008/0191101 A1 | 8/2008 | Hatton | |
| 2008/0213090 A1 | 9/2008 | Hatton | |
| 2008/0223979 A1 * | 9/2008 | Schlunke | 244/12.2 |
| 2009/0065649 A1 | 3/2009 | Babinsky | |
| 2009/0242689 A1 | 10/2009 | Hatton | |

FOREIGN PATENT DOCUMENTS

| | | |
|---|---|---|
| DE | 299 14 928 U1 | 3/2001 |
| GB | 942856 | 12/1961 |
| GB | 915515 | 1/1963 |
| GB | 2387158 A | 10/2003 |
| WO | WO 02/070342 A1 | 9/2002 |
| WO | WO2006/100523 | 9/2006 |
| WO | WO2006/100524 | 9/2006 |
| WO | WO2006/100525 | 9/2006 |
| WO | WO2006/100526 | 9/2006 |

OTHER PUBLICATIONS

International Preliminary Report on Patentability for PCT/GB2006/050064.
Written Opinion of the International Search Authority for PCT/GB2006/050064.
International Search Report for PCT/GB2006/050064.
International Search Report published Nov. 23, 2006 for PCT/GB2006/050067 filed Mar. 23, 2006.
International Preliminary Report on Patentability published Sep. 25, 2007 for PCT/GB2006/050067 filed Mar. 23, 2006.
Written Opinion of the International Searching Authority Published Sep. 23, 2007 for PCT/GB2006/050067 filed Mar. 23, 2006.
International Search Report published Dec. 21, 2006 for PCT/GB2006/050066 filed Mar. 23, 2006.
International Preliminary Report on Patentability published Sep. 25, 2007 for PCT/GB2006/050066 filed Mar. 23, 2006.
Written Opinion of the International Searching Authority Published Sep. 23, 2007 for PCT/GB2006/050066 filed Mar. 23, 2006.
International Search Report published Sep. 28, 2006 for PCT/GB2006/050064 filed Mar. 23, 2006.
International Preliminary Report on Patentability published Sep. 25, 2007 for PCT/GB2006/050064 filed Mar. 23, 2006.
Written Opinion of the International Searching Authority Published Sep. 23, 2007 for PCT/GB2006/050064 filed Mar. 23, 2006.
International Search Report published Sep. 28, 2006 for PCT/GB2006/050065 filed Mar. 23, 2006.
International Preliminary Report on Patentability published Sep. 25, 2007 for PCT/GB2006/050065 filed Mar. 23, 2006.
Written Opinion of the International Searching Authority Published Sep. 23, 2007 for PCT/GB2006/050065 filed Mar. 23, 2006.
Office Action mailed Jun. 10, 2009 for U.S. Appl. No. 11/909,515, filed Sep. 24, 2007, published Mar. 12, 2009 under publication No. 2009/0065649.
Oxford Dictionaries Online, definition of Oblate retrieved from Internet on Jul. 12, 2010.
Gregory-Smith D.G. et al, The Discharge from a Thin Slot Over a Surface of Convex Curvature, Int. J. Mech. Sci. vol. 24, No. 6, pp. 329-339, 1982.
Office Action for U.S. Appl. No. 11/909,500 dated May 21, 2010.

* cited by examiner

Canopy Profile

Local Jet Height

Local Radius of Curvature

Differential of Radius with respect to X co-ordinate

THRUST GENERATING APPARATUS

FIELD OF THE INVENTION

This invention relates to apparatus which uses the Coanda Effect to divert a flow of fluid thereby producing a desired thrust.

BACKGROUND OF THE INVENTION

The Coanda effect is a phenomenon which tends to keep a jet of fluid attached to a surface over which it flows. It is discussed in a paper by Gregory-Smith entitled "The Discharge from a thin slot over a surface of convex curvature" (*Int. J. Mech. Sci.* Vol 24 No. 6 pp 329-339). This paper reports on an experimental study to determine the minimum radius r which the jet will follow without breaking away from it.

The results of the above experiments show that for any given $P_0/Pa$ ratio (where $P_0$ is the total pressure and Pa is the ambient pressure) there is a value of b/r (where b is the jet width) below which the jet will be attached to the curved surface.

Above this value there is a range of b/r values where the jet is bistable in the sense that, on start-up, the jet will separate from the curved surface but, if constrained to follow it by some external effect, will then remain attached.

Above another value, the jet will separate from the curved surface and the Coanda effect does not exist.

Existing literature includes many fanciful descriptions of flying machines in the shape of inverted "saucers." For example, Patent Specification GB2387158 describes a proposal where a fan directs air over a convex disc to produce lift. Patent Specification U.S. Pat. Nos. 5,503,351 and 3,276,723 describe arrangements where an air jet flows on opposite sides of a disc shaped aerofoil to create lift. U.S. Pat. No. 5,803,199 describes a hovercraft that also uses airflow over an outside surface of the craft to achieve a supplementary lifting effect. U.S. Pat. No. 5,054,713 describes an arrangement in which an air jet flows over an "oblately spheroidal" body to derive lift. Each of these known proposals either fails to discuss the precise curvature of the aerofoil surface or assumes that conventional practices associated with jet flow over a surface curved in a single plane will equally apply for surfaces that have double convex curvature. Patent specification U.S. Pat. No. 2,978,206 describes a vehicle where a fan causes air to flow over a surface that is described as generally parabolic and that has a tight radius of curvature at the downstream edge of the surface.

SUMMARY OF THE INVENTION

The invention arose from consideration of the fact that optimum lift would be obtained by reducing to a minimum the amount of surface over which the jet must flow in order to be diverted by the required amount. It appeared to the inventor that, contrary to prior proposals, the optimum canopy shape might be expected to follow a curve similar to the relationship between the width b of the jet and the radial distance x.

Thus, according to the invention there is provided a thrust generating arrangement comprising means for causing fluid to flow radially outwardly from a central position over a surface with double convex curvature about an axis, this surface serving to divert the radial flow towards an axial direction by operation of the Coanda effect; characterised in that the radius of curvature decreases progressively less rapidly with increasing distance from the axis and in that a downstream periphery of the surface is substantially straight in the direction of flow.

The curve of the surface, in the downstream direction of flow, is preferably designed to maintain the jet in its bistable state, when the arrangement is operating at full power, thereby minimising the surface area over which the jet must flow and consequently minimising drag.

The aforementioned surface is preferably dome-shaped. It will normally have a smooth continuous surface but in some variations, a peripheral edge of the dome may be segmented so that the curve at the centre of each segment is slightly different to the curve at joins between the segments. An advantage of a segmented arrangement is that it can conveniently be made using a ribbed frame with lightweight panels between the ribs. It also permits the downstream edge of each segment to be straight, this facilitating attachment of a control flap if required.

BRIEF DESCRIPTION OF THE DRAWINGS

One way in which the invention may be performed will now be described by way of example with reference to the accompanying drawings in which.

DETAILED DESCRIPTION OF THE INVENTION

Figure 1:
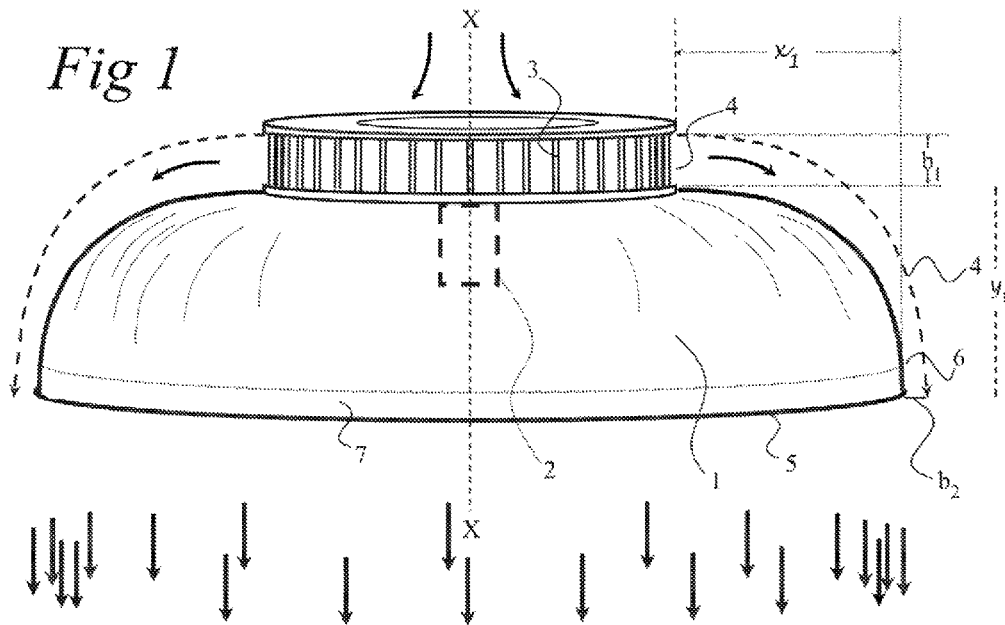
FIG. 1 is a perspective view of a vertical take-off aircraft constructed in accordance with the invention and incorporating a canopy over which a jet of air is constrained to flow by the Coanda effect.
Figure 1A:
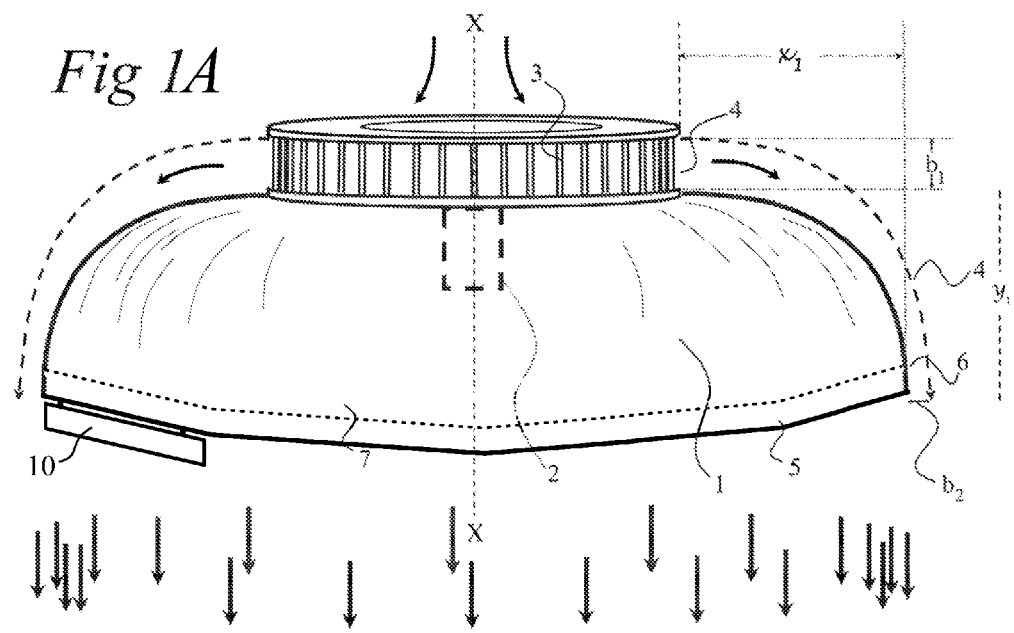
Fig. 1A illustrates the aircraft of FIG. 1, provided with a canopy having a polygonal shaped peripheral edge.

Referring to FIGS. 1, the illustrated aircraft comprises a dome-shaped canopy 1 supporting an engine 2 which in this particular embodiment is an electric motor. The motor 2 drives a radial fan 3 which propels air radially from a circular outlet slot 4 of height $b_1$. The resulting radially flowing jet of air flows over the canopy 1 and is kept in contact with it by the Coanda effect until it reaches a bottom edge 5 where it becomes detached, forming a near-vertical annular jet. The downward momentum of this jet results in an equal upward momentum transferred to the aircraft.

Figure 2A:
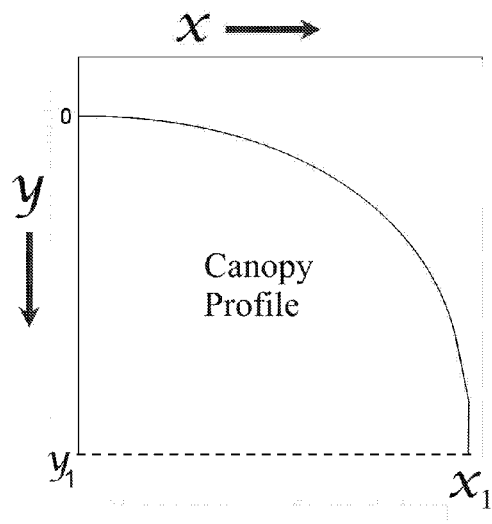
FIG. 2A is a graph showing the curvature of a canopy of the aircraft of FIGS. 1 and 2.

FIG. 2A shows the precise curvature of the canopy, in the direction of flow of the jet, between the outlet slot 4, and a point 6, close to, but separated from, the peripheral edge 5. A cylindrical part 7 of the canopy surface between the edge 5 and point 6 is straight (in the direction of flow). This ensures that pressures are equalised on each side of the canopy surface where the jet leaves the edge 5, avoiding undesired deviation of the direction of flow at that point.

The aforementioned surface is preferably dome-shaped. It will normally have a smooth continuous surface but in some variations, a peripheral edge of the dome may be segmented so that the curve at the centre of each segment is slightly different to the curve at joins between the segments. An advantage of a segmented arrangement is that it can conveniently be made using a ribbed frame with lightweight panels between the ribs. It also permits the downstream edge of each segment to be straight, this facilitating attachment of a control flap 10, if required.

Figure 2B:
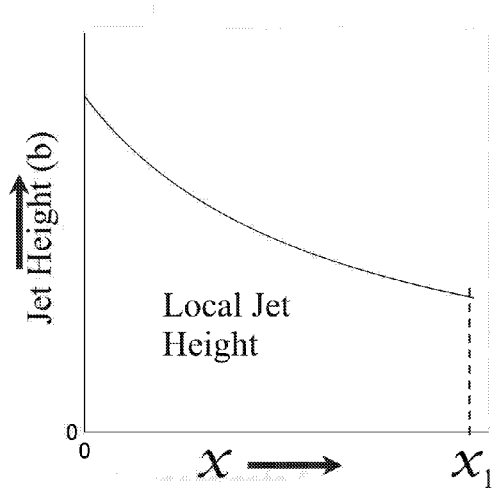
FIG. 2B is a graph showing the variation of jet height with respect to radial distance as measured from an upstream end of the jet (as calculated theoretically assuming frictionless flow)

FIG. 2B shows how the width b of the jet diminishes with increasing distance x from an axis X-X (as calculated theoretically assuming frictionless flow). The reason for this is that the volume of flow remains constant for all points along the direction of flow, whilst the area of flow increases with increasing distance from the X-X axis. Note that the rate of change of b (or, to be more precise, the modulus of the rate of change) diminishes towards greater values of x.

Figure 2C:
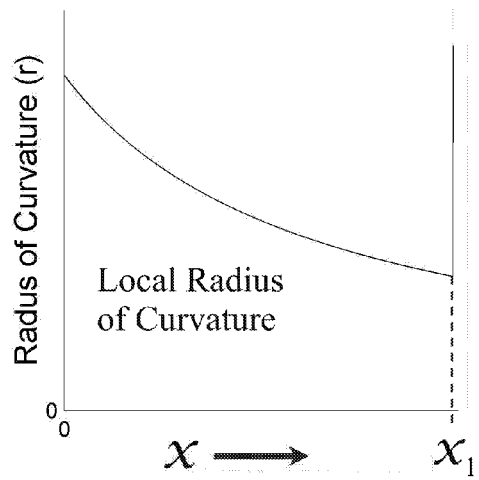
FIG. 2C is a graph showing a variation of radius of curvature with respect to the radial distance from the axis.
Figure 2D:
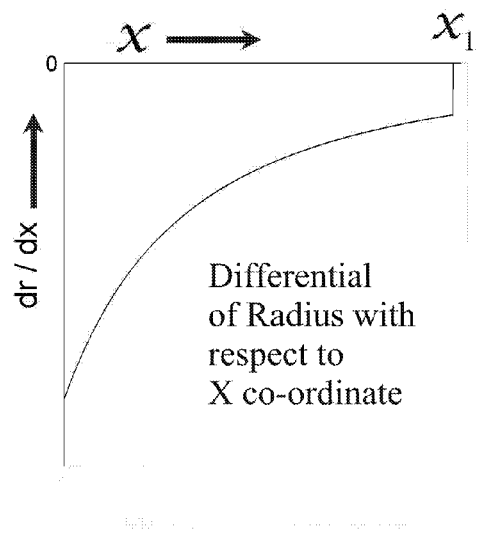
FIG. 2D is a graph showing a variation of the rate of change of curvature with respect to the radial distance.

FIG. 2C shows variations of the radius of curvature r of the canopy along a line parallel to the direction of flow. In accordance with the invention, the shape of this curve follows the shape of curve 2B so that the rate of change of radius decreases with increasing values of x. The similarity between the graphs 3B and 3C is readily apparent. FIG. 2D shows the rate of change of radius plotted against x from which it will be seen that even the second derivative also diminishes with increasing x values.

Tests on a model constructed along similar lines to that described have proved remarkably successful in terms of the thrust achieved and the stability and manoeuvrability during flight. It is believed that this is attributable partly to the unique shape of the canopy surface, allowing the maximum possible Coanda effect to be achieved at all points on the canopy. However, it will be appreciated that the illustrated design has been described only for the purposes of example and that many variations are possible. For example, the invention is not limited to use on aircraft. It would be equally applicable in submarines and vehicles designed to move through other fluids. It could also be used in devices such as fans or heaters which are designed to produce a thrust of air or gas without movement of the machine itself, and no doubt many other applications will be apparent within the scope of the accompanying claims.

The invention claimed is:

1. A vertical take-off aircraft, comprising:
   means for causing fluid to flow radially outwardly from a central position over a canopy having a surface with double convex curvature about an axis, this surface serving to divert the radial flow towards an axial direction by operation of the Coanda effect and having a radius of curvature which decreases progressively less rapidly with increasing distance from the axis to a point close to but separated from a peripheral edge of the canopy; and
   a peripheral portion extending from the curved surface to a downstream peripheral edge which is substantially straight in the direction of flow.

2. The aircraft according to claim 1 wherein the second derivative of the radius of curvature with respect to distance from an axis diminishes with increasing distance from the axis.

3. A thrust generating arrangement The aircraft according to Claim 1, wherein the radius of curvature is selected to minimize the surface area over which the jet must flow.

4. The aircraft of claim 1 wherein the turning of the flow changes the momentum of the flow to generate a reactive force serving to suspend and/or propel the aircraft.

5. The aircraft of claim 1, wherein the means for causing the fluid to flow includes a radial fan.

6. The aircraft of claim 1, wherein the surface is a dome shape.

7. The aircraft of claim 1, wherein a peripheral edge of the dome is polygonal.

8. A thrust generating arrangement, comprising:
   a support having an exterior fluid flow surface defining a convex curvature and a segmented peripheral edge, wherein the fluid flow surface forms a downstream edge that is straight;
   a radial fan connected to said support and positioned to rotate about an axis of said convex curvature to create and direct a fluid flow radially from said axis, said fluid flow attachable along at least a portion of said exterior fluid flow surface by the Coanda effect, said fluid flow detachable when said fluid flow flows beyond said fluid flow surface to form a near-vertical annular jet, said fluid flow having a height which decreases with an increase in distance from the axis of said convex curvature.

9. The thrust generating arrangement of claim 8, wherein a control flap extends from a segment of said peripheral edge.

10. The thrust generating arrangement of claim 8, wherein the radius of said convex curvature diminishes with an increasing distance from the axis, over a portion of said convex curvature.

11. A thrust generating arrangement, comprising:
    a support having an exterior fluid flow surface forming a convex curvature defining an axis, the convex curvature having a radius that diminishes with an increasing distance from the axis over a portion of said convex curvature;
    a radial fan connected to said support and positioned to rotate about the axis of said convex curvature to create and direct a fluid flow radially from said axis, said fluid flow attachable along at least a portion of said exterior fluid flow surface by the Coanda effect, said fluid flow detachable when said fluid flow flows beyond said fluid flow surface to form a near-vertical annular jet, said fluid flow having a height which decreases with an increase in distance from the axis of said convex curvature.

12. The thrust generating arrangement of claim 11, wherein said convex curvature includes a segmented peripheral edge, wherein the fluid flow surface forms a downstream edge that is straight.

13. The thrust generating arrangement of claim 12, further including at least one control flap extending from said segmented peripheral edge.

14. The thrust generating arrangement of claim 11, wherein the radius of said convex curvature diminishes with an increasing distance from the axis, over a portion of said convex curvature.

15. The thrust generating arrangement of claim 11, wherein said convex curvature is shaped to minimize the amount of surface over which the fluid flow must flow in order to be diverted to form said near-vertical annular jet.

* * * * *